United States Patent [19]

Baroni et al.

[11] Patent Number: 4,646,217
[45] Date of Patent: Feb. 24, 1987

[54] MULTIPLE OUTPUTS SWITCHING POWER SUPPLY

[75] Inventors: Giuseppe Baroni; Gianpaolo Montorfano, both of Milan, Italy

[73] Assignee: Honeywell Information Systems Italia, Milan, Italy

[21] Appl. No.: 775,863

[22] Filed: Sep. 13, 1985

[30] Foreign Application Priority Data

Oct. 18, 1984 [EP] European Pat. Off. ........... 84112556

[51] Int. Cl.[4] ........................................... H02M 3/335
[52] U.S. Cl. ...................................... 363/17; 363/26; 363/41; 363/98
[58] Field of Search ....................... 363/17, 26, 41, 80, 363/98, 21, 97

[56] References Cited

U.S. PATENT DOCUMENTS 4,122,514 10/1978 Amin ..................................... 363/21

FOREIGN PATENT DOCUMENTS 54-140154 10/1979 Japan ..................................... 363/17

OTHER PUBLICATIONS

IBM Technical Disclosure Bulletin, vol. 25, No. 2, Jul. 1982, p. 626, "Low Tolerance Multiple-Output Switched Power Supply" by D. Azzis, B. Bibal and M. Launay.

Primary Examiner—Patrick R. Salce
Assistant Examiner—Jeffrey Sterrett
Attorney, Agent, or Firm—Faith F. Driscoll; John S. Solakian

[57] ABSTRACT

A multiple output switching power supply wherein the voltage at a main output which couples to a main secondary winding of a transformer is regulated by pulse width modulation of the current flowing in the primary winding of the transformer and wherein the voltage at an auxiliary output which couples to an auxiliary secondary winding of the transformer is regulated by pulse width modulation of the current flowing in the auxiliary winding. The pulse width modulation is performed in synchronism with a preestablished turn-on delay of the control switches which control current pulses in the primary winding as to the turn-on of the switches which control current pulses in the auxiliary winding. Besides avoiding the need for a filter between the auxiliary winding and the related control switch, this form of synchronization reduces switching power losses, current spikes and induced radio frequency emission.

5 Claims, 5 Drawing Figures

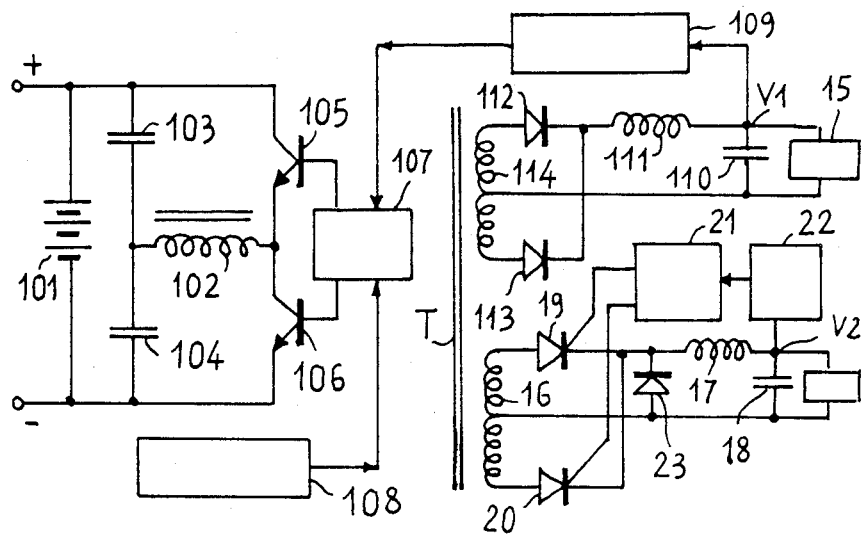
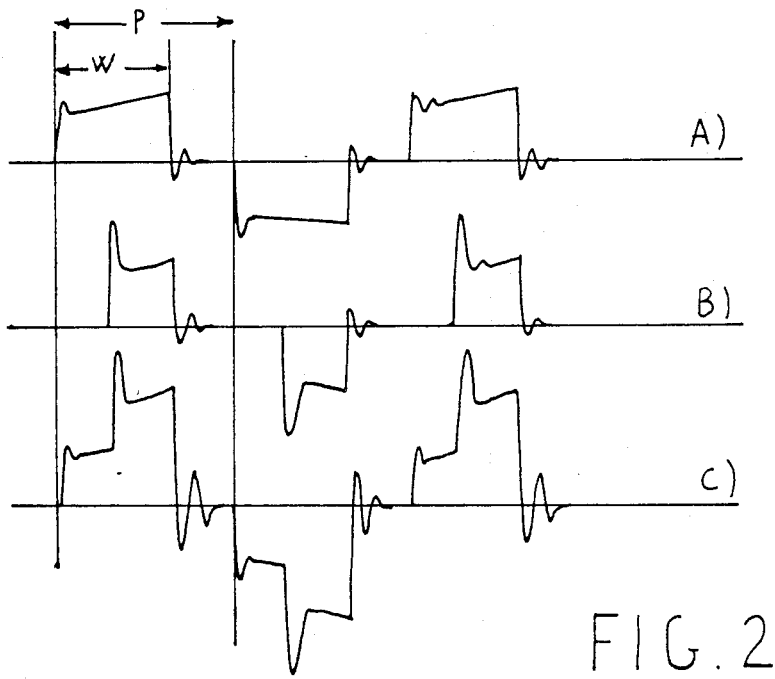
(PRIOR ART) FIG. 1
FIG. 2

MULTIPLE OUTPUTS SWITCHING POWER SUPPLY

BACKGROUND OF THE INVENTION

1. Field of Use

This invention relates to an improved multiple output switching power supply which provides a number of different regulated output voltages at the outputs of a number of secondary windings of a power transformer. A main output direct current voltage is derived from one of current flowing in the primary winding of the transformer. Auxiliary direct current output voltages are derived by rectifying the voltage at each of the other secondary windings and each secondary winding is controlled by its own regulator.

2. Prior Art

The most important requirements which must be satisfied by power supplies are efficiency, compactness, reliability and low radio frequency emission.

Great efficiency is usually attained by using transistors as switches in pulse width modulation circuits for controlling both the main output voltage and the auxiliary voltages. This is obtained with a trade off of more components, hence, cost and size increase.

In addition to the transistor and control circuit for each auxiliary voltage source, a storage filter is required between the secondary winding and the control transistor.

Compactness is usually attained by using high switching frequencies for the pulse width modulation process so as to reduce the size of transformer and filters. The switching frequency is limited by the performances of the transistors and by the trade off of less efficiency due to switching power losses in the transistors.

In order to attain compactness and cost reduction by elimination of some components, U.S. Pat. No. 4,122,514 discloses a D.C. power supply where auxiliary output voltages are controlled by SCR devices triggered by a control circuit responsive to the ripple of the auxiliary output voltage. A pulse width modulation of the pulsed power feeding the auxiliary output is obtained which overlaps the pulsed power feeding of the transformer, controlled by the main output voltage regulator. In this way, the storage filter intermediate to the auxiliary winding and the switching transistor of the auxiliary output is no longer required.

However, there are several disadvantages to this approach. The use of SCR limits the operating switching frequency of the power supply as compared to the switching frequency allowed by faster devices such as transistors and, more recently, power FETs (Field Effect Transistors). The SCRs and the primary winding switches are fully affected by the current spikes caused by the free-wheel diode associated with each output filter when such SCRs are switched on. The switching transistors controlling the current flowing in the primary winding of the transformer, must switch off the full equivalent current feeding both the main output section and all the auxiliary output sections.

Hence, large switching losses are caused in such transistors which must withstand thermal stress and/or must be provided with adequate and cumbersome heat dissipation devices. The large current ringing induced in the transformer at switch-off, causes a remarkable radio frequency emission which is required to be limited at an acceptable level by large sized snubbers.

SUMMARY OF THE INVENTION

The direct current power supply of the present invention overcomes the above disadvantages and provides for a power system having at least an auxiliary output voltage, where no auxiliary intermediate filter is required, and where the switch-off losses of switching transistors are minimized. Further, current spikes at switch-on are minimized. According to the invention, there advantages are obtained by proper synchronization of the control circuits for the main output voltage and the auxiliary output voltage or voltages.

More precisely, a common oscillator establishes the switching frequency for both the main output control circuit and the auxiliary output(s) control circuit(s) The common oscillator provides a clock signal which triggers a first pulse width modulation circuit which control the on/off switching of the main output control transistors, and second(s) pulse width modulation circuit(s) which control switching of auxiliary output(s) control transistors within the period during which the main output control transistors are conductive. By virtue of intrinsic delay of switching components and if so required by the addition of a delaying element, the main output control transistor is switched on when the auxiliary output control transistors are already switched on, thus minimizing uncontrollable current spikes.

BRIEF DESCRIPTION OF THE DRAWINGS

The above features and the advantages of the invention will appear more clearly from the following description and from the related drawings in which:

FIG. 1 is a circuit diagram of a prior art switching power supply;

FIG. 2 is a timing diagram showing the current flowing in selected elements of the power supply of FIG. 1;

DESCRIPTION OF THE PRIOR ART

Figure 3:
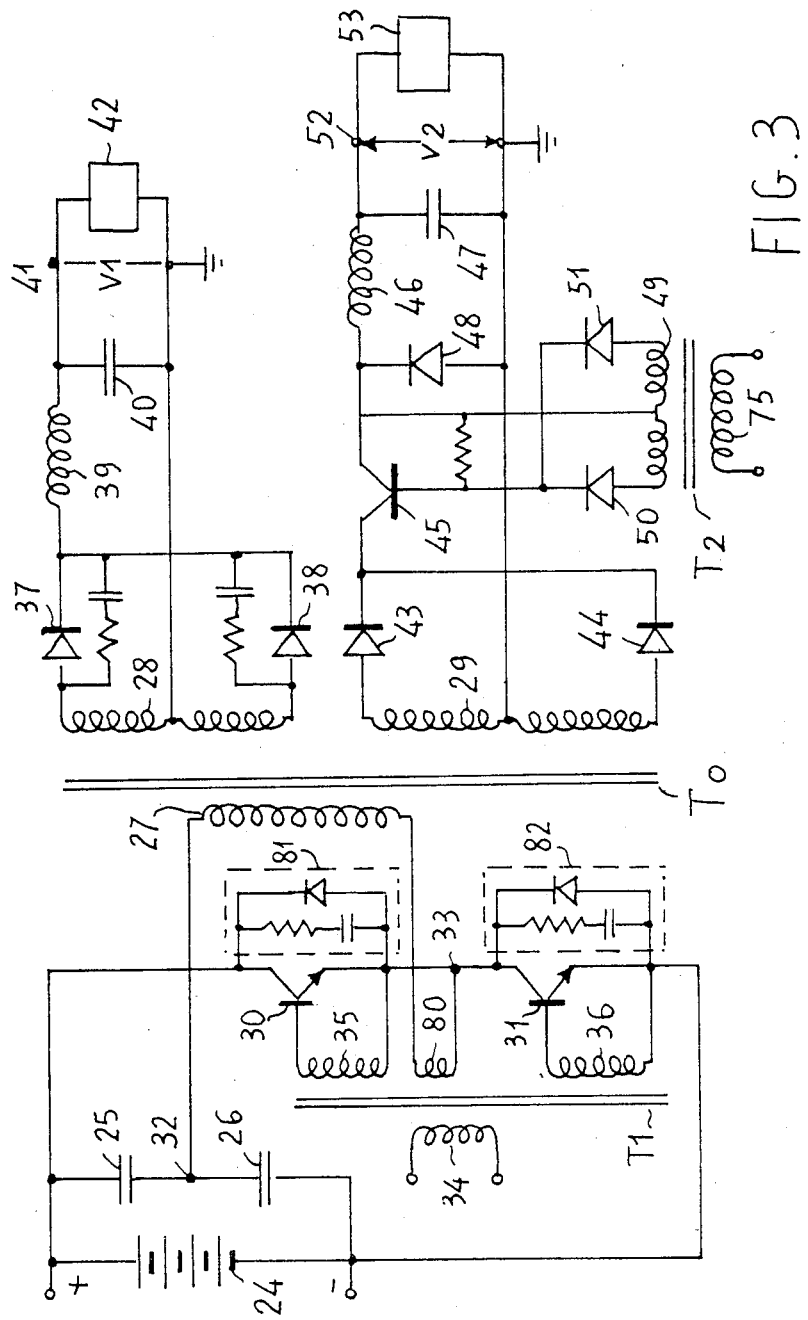
FIG. 3 is a circuit diagram of the power section of the power supply of the invention.

For a better understanding of the invention, it is advisable to refer first to FIG. 1 which shows a power supply implemented as disclosed by U.S. Pat. No. 4,122,154. A D.C. source 101 feeds a primary winding 102 of a transformer T through a pair of capacitors 103 and 104 series connected across the D.C. power source 101 and a pair of transistors 105 and 106 alternatively driven into conduction by a base drive circuit 107, controlled by an oscillator 108 and a pulse width modulation circuit 109. The pulse width modulation circuit 109 is responsive to the voltage sensed at a main output V1 of the power supply which is fed through an LC filter (comprising capacitor 110 and inductor 111) and a pair of diodes 112 and 113 by a center tapped secondary winding 114 of a transformer T. Oscillator 108 defines the period at which transistors 105 and 106 are alternatively switched on and pulse width modulation circuit defines the variable interval duration which transistors 105 and 106 are kept conductive. Such duration is inversely proportional to the error of detected voltage V1 in excess over a preestablished reference value.

FIG. 2 shows in timing diagram (A) the current flowing in the primary winding 102, which is required to maintain the desired voltage at output V1. The time interval P between subsequent alternate current pulses is defined by oscillator 108. The pulse width W is defined by modulator 109 within period P and varies in dependence upon the detected voltage V1 which, in turn, is affected by the power drained by a load 15.

In addition to a secondary winding 114, a further secondary, center tapped auxiliary winding 16 is provided, which feeds an LC filter (composed of inductor 17 and capacitor 18) through a pair of controlling SCRs 19 and 20 alternately triggered by a base drive circuit 21. The base drive circuit 21 is controlled by a comparator 22 responsive to the voltage V2 at capacitor 18 terminals. When voltage V2 drops below a reference value, a drive command is forwarded to circuit 21 which alternately triggers either one or the other of SCRs 19 and 20. Either SCR 19 or SCR 20 remains conductive until a voltage is induced in winding 16 due to the feeding of primary winding 102. A diode 23 is coupled to inductor 17 and capacitor 18 to sustain current in inductor 17 when either SCR 19 or 20 switches off.

FIG. 2 shows in timing diagram B the equivalent current flowing in the primary winding 102 due to the operation of auxiliary output circuit fed by auxiliary winding 16. Within period P either SCR 19 or 20 is triggered to switch on when voltage is already induced in winding 16 at the instant that comparator 22 detects a voltage V2 drop below the reference value. At this instant, diode 23 is forward biased into conduction, and if a sudden reverse voltage is applied, it acts as a short circuit, until the junction charge is removed, then as a capacitor, until a reverse bias charge is built up. Therefore, a sudden current spike is produced by the auxiliary winding and this affects the primary winding.

Some attenuation effect is produced by the turn-on time of the SCR, which is not controllable, and is to some extent, unpredictable. Thereafter, a current pulse is established, which is limited by inductor 17, and which has a variable duration W1, and ends with the switching off of transistor 105 or 106 when transformer T ceases to be powered.

FIG. 2 shows in diagram C the current flowing in the primary winding due to the combined operation of the main output and auxiliary output. The following four different considerations are readily apparent in connection with such diagram.

1. Switching Losses

Transistors 105 and 106 are affected by turn-on losses which are proportional to the equivalent current amplitude of the pulses in the secondary winding 114. They are further affected by turn-off losses which are proportional to the sum of equivalent current amplitude of the pulses in secondary winding 114 and the equivalent current amplitude of the pulses in secondary winding 16. These turn off losses, much more than the turn-on losses and due further to the substantially inductive nature of their load, heavily affect and limit the operation of the transistors and impose the adoption of adequately power rated transistors and cumbersome heat dissipators. The SCRs, in turn, are affected by turn-on losses which exceed the average current amplitude of the pulses at secondary winding 16 due to the initial current spike.

2. Current Rating

Transistors 105 and 106 must be current rated in order to sustain the sum of the equivalent current amplitude of pulses in secondary winding 114, the equivalent current amplitude of pulses in secondary winding 16 and the amplitude of the current spikes due to diode 23. SCRs 19 and 20 must be current rated in order to sustain the sum of the average current amplitude of pulses in secondary winding 16 and the current amplitude due to diode 23.

3. Radio Frequency Emission

Transistors 105 and 106 are switched off at a substantially full current load and cause transformer ringing at high frequency with high current levels. Therefore, high radio frequency emissions are produced, which, in order to be kept at acceptable level, require the adoption of large sized snubber circuits and consequently result in additional power waste.

4. Switching Frequency

The use of SCRs as switches limits the switching frequency of the power supply to values acceptable by such devices, typically 30-50 KHz, and therefore larger transformer and filters are required than in case of adopting high switching frequences.

In summary, the power supply of FIG. 1, as compared to conventional multiple output power supplies where each output has its own autonomous oscillator, pulse width modulator and switching elements, offers the advantage of avoiding the need of intermediate energy storage filter between the auxiliary secondary winding and the switching elements, but leaves unresolved the several problems mentioned.

DESCRIPTION OF THE PREFERRED EMBODIMENT

Figure 4:
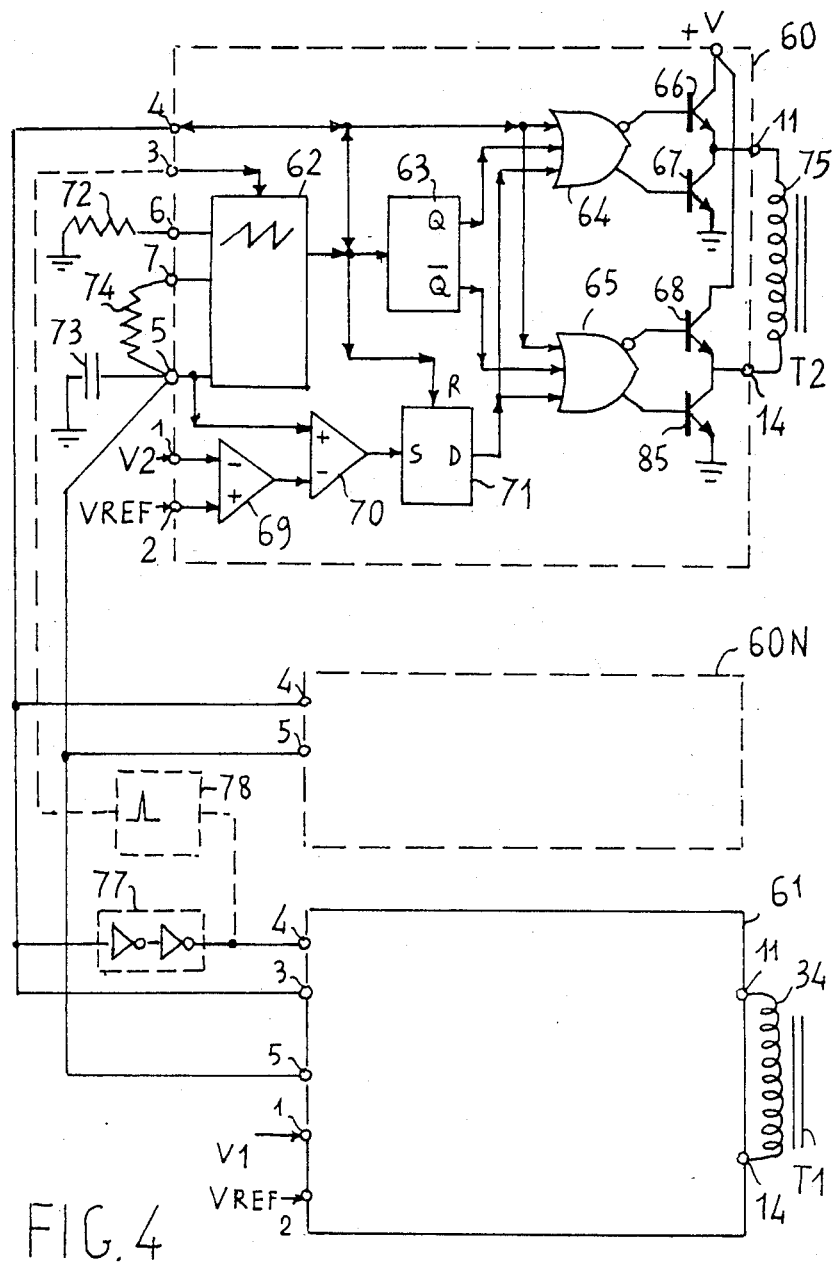
FIG. 4 is a circuit diagram of the control section of the power supply of the invention; and, FIG. 5 is a timing diagram of voltages and current at selected points of the power supply of the invention.

FIG. 3 shows the power section of a multiple output power supply designed according to the invention, which overcomes the above mentioned limitations. FIG. 4 shows the control section of the power supply of FIG. 3. With reference to FIG. 3, the power supply of the invention comprises an unregulated D.C. power source 24, which may be obtained from a rectified D.C. source, a pair of capacitors 25 and 26 series connected to the terminals of the D.C. power source, a transformer T0 having a primary winding 27 and two center tapped, secondary windings 28 and 29. A pair of transistors 30 and 31, series connected between the terminals of the D.C. power source 24. control the alternate current flowing in primary winding 27 which is connected to the intermediate point 32 between capacitors 25 and 26 and the intermediate point 33 between transistors 30 and 31 through regenerative winding 80. Transistors 30 and 31 are transformer driven through a transformer T1, having a primary winding 34, a regenerative winding 80 and two secondary windings 35 and 36, each coupled to the base and emitter of transistors 30 and 31, respectively. Snubber elements 81 and 82, each comprising a bypass diode and an RC path, is coupled between collector and emitter terminals of transistors 30 and 31.

By feeding primary winding 34 of transformer T1 with voltage pulses of alternate polarity, the transistors 30 and 31 are alternately switched on, and current pulses of alternate polarity are let to flow in primary winding 27. This structure, conventional and well known in the art, is only exemplary of several ways in which the primary of transformer T0 may be controlled and fed.

The terminals of center tapped secondary winding 28 are coupled through diodes 37 and 38 to an input terminal of an LC filter comprised of an inductor 39 and a capacitor 40. The other input terminal of LC filter is connected to the center tap of winding 28, which is also grounded. When primary winding 27 is pulse driven, the e.m.f. induced in secondary winding 28 causes current pulses to load the LC filter and generate a voltage V1 (a main output voltage) at terminal 41. Voltage V1 feeds a load 42 and, as shown in FIG. 4, provides a feedback signal to the control circuit.

By comparing V1 with a reference voltage, an error signal is developed which is used to control the width of the pulses which switch on transistors 30 and 31, thus modulating the power fed to the LC filter and keeping V1 close to the desired value. Terminals of center tapped secondary winding 29 are coupled through diodes 43 and 44 to a collector of a control transistor switch 45. The center tap of winding 29 is grounded. An emitter terminal of transistor 45 is connected to the input of an LC filter comprising an inductor 46 and a capacitor 47 and diode 48. Transistor 45 is controlled by current pulses applied to its base through a transformer T2 having a center tapped secondary winding 49 whose terminals are connected through diodes 50 and 51 to the transistor's base with the center tap being connected to its emitter. Suitable circuits exemplified by resistor 83 provide transistor turn-off at the termination of current pulses.

When primary winding 27 of transformer T0 is pulse driven and transistor 45 is rendered conductive, the e.m.f. induced in secondary winding 29 causes the current pulses to load the LC filter comprising elements 46 and 47 and to generate a voltage V2 (an auxiliary output voltage at terminal 52. Voltage V2 feeds a load 53 and, as shown in FIG. 4, provides a feedback signal to the control circuit. By comparing V2 with reference voltage, an error signal is developed which is used to control the width of the pulses which switch on transistor 45, thus modulating the power fed to the LC filter comprising elements 46 and 47 and keeping V2 close to the desired value.

In FIG. 3, the power supply is shown as having two secondary outputs only, but clearly more than two outputs may be provided. FIG. 4 shows the control section of the power supply of the present invention, is essentially comprised of a plurality of regulating pulse width modulators 60, 61 and 60N, one for each secondary output, and suitably connected to each other. Such regulating pulse width modulators are available on the market as integrated circuits, such as, for instance, those marketed by the U.S. firm Unitrode under the part number code UC 3525A. For ease of description, which may be completed by the technical specifications, reference is made to such devices although different integrated circuits of discrete components circuits can also be used. Regulating pulse width modulator 60 comprises a sawtooth oscillator 62, a toggle flip-flop 63, two NOR circuits 64 and 65 having both inverting and non-inverting outputs, four output transistors 85, 66, 67 and 68, an error amplifier 69, a comparator 70 and a set-reset flip-flop 71.

The frequency of oscillator 62 is determined by three external components, a resistor 72 connected between ground and pin 6 of the integrated circuit, a capacitor 73 connected between ground and pin 5 of the circuit and a resistor 74 connected between pins 5 and 7 of the circuit. Here and in the following reference numbers of the pins of modulator 60, are the same as those used for identifying the UC 3525A integrated circuit pins. The value of resistor 72 defines the current level provided by a constant current generator (internal to oscillator 62) to capacitor 73. Hence, the value of resistor 72 and the value of capacitor 73 jointly define the interval time required for charging capacitor 73 to a preestablished voltage level. When such level is attained, oscillator 62 delivers internally to circuit 60 and to pin 4, a positive blanking pulse which also enables capacitor 73 to discharge through resistor 74. The interval time required to discharge capacitor 73 to another preestablished level is defined by the value of resistor 74. Once capacitor 73 is discharged, the positive blanking pulse available at pin 4 drops to zero. The sum of charge and discharge time of capacitor 73 defines the oscillator period (hence frequency).

The sawtooth voltage signal, available at pin 5 and the blanking pulses available at pin 4, are used to control the other circuit elements. Error amplifier 69 receives at non-inverting input (Pin 2), a reference voltage VREF2 and at inverting input (Pin 1), the voltage V2 sensed at the auxiliary output 52 (FIG. 3). Error amplifier 69 produces at the output, a positive error voltage signal whose amplitude increases the more voltage V2 is below the reference signal. The error voltage signal is fed to the inverting input of comparator 70 which receives at the non-inverting input, the sawtooth voltage signal available on pin 5. When the sawtooth voltage level exceeds the error voltage signal, a positive voltage level is produced at the output of comparator 70 and sets flip-flop 71.

The positive blanking pulses generated by oscillator 62 which are available at pin 4 provide the resetting of flip-flop 71. They further feed the clock input of flip-flop 63 causing its toggling. NOR gate 64 receives at its inputs, the signal output from flip-flop 63 and the blanking pulses output from oscillator 62. Likewise NOR gate 65 receives at its inputs the signal output from flip-flop 71, the signal output from the $\overline{Q}$ output of flip-flop 63 and the blanking pulses output from oscillator 62. The inverting and non-inverting outputs of NOR gate 64, respectively, drive totem pole connected transistors 66 and 67 to connect through pin 11, a terminal of winding 75 to a voltage source +V or to ground. The inverting and non-inverting outputs of NOR gate 65, respectively, drive totem pole connected transistors 68 and 85 to connect through pin 14, the other terminal of winding 75 to the voltage source +V or to ground. Winding 75 is the primary winding of transformer T2 (FIG. 3).

The operation of the control circuit described is readily apparent. The energization voltage +V is applied to winding 75 in alternate directions at each subsequent period of the oscillator, during the interval in which capacitor 73 charges and until a charge level is attained which exceeds the error signal. Thereafter, energization is interrupted. The width of such energization interval depends on the error signal and may range from zero to the full duration of the capacitor charge time. During capacitor discharge, blanking pulses prevent any energization of winding 75.

The structure and operation of regulating pulse width modulator 61 and possible additional regulators 60N is identical to the one described. Pulse width modulator 61 has pins 11 and 14 connected to primary winding 34 of transformer T1 and controls main output voltage V1, which is fed back to input pin 1 and compared with a reference voltage VREF1 applied to input pin 2.

It will now be shown how regulators 60, 61 and 60N are synchronized in order to achieve the desired results which, besides avoiding intermediate storage filters between auxiliary windings, such as 29 and related control switch, such as 45, minimize switching power losses, current spikes and radio frequency emission. Considering again FIG. 4, it can be seen that pin 5 of regulators 60, 61 and 60N are all connected together and that regulators 61 and 60N are not provided with external components, such as resistors 72, 74 and capacitor 73 to establish a ramp interval and a blanking interval for their internal oscillator.

Instead, such regulators make a common and synchronous use of the voltage sawtooth signal available at pin 5 of regulator 60 which is fed to their internal comparator, corresponding to comparator 70. Control of their internal flip-flops (corresponding to flip-flops 63 and 71) and output gates (corresponding to NORs 64 and 65) is performed by directly connecting pin 4 of regulator 60 with corresponding pin 4 of regulator 60N and by connecting pin 4 or regulator 60 with the corresponding pin 4 of regulator 61 through a delay element 77 which, for instance, is in the form of series connected inverters or logic gates. Therefore, blanking pulses are fed without or with delay from regulator 60 to regulators 60N and 61. More precisely, with the assumption that identical regulators in the form of the already mentioned integrated circuit are used, the oscillators, equivalent to 62 in regulators 60N and 61, cannot be deactivated. Therefore, it may even occur that the oscillator in regulator 60N, produces a blanking pulse somehow in advance of oscillator 62. In this case, it is regulator 60N which leads the generation and distribution of blanking pulses to the other regulators, the duration of blanking pulses being always imposed by the discharge time of capacitor 73, hence, by oscillator 62. By the same token, it may happen that the oscillator in regulator 61 produces a blanking pulse somehow in advance of oscillator 62, which pulse is not sensed by the other regulators due to the presence of delay element 77. The only deriving effect is that maximum duty cycle of transistors controlled by regulator 61 is somehow less than the one expected when considering the width of blanking pulses at pin 4 of the other regulators. If this effect is to be avoided, it is possible to connect pin 4 of regulator 61 to the synchronization pin of regulator 60 (or any other regulator) through a derivative network 78 (capacitor, univibrator) to prevent self sustaining due to delay element 77. Since this connection is optional, it has been shown in dotted lines.

For reasons that will appear clearer in the following, it is also advisable that blanking pulses received by regulator 61, rather than being delayed, have an extended duration but be received simultaneously with their rise. For this purpose, pin 4 of regulator 60 is connected to the synchronization pin 3 of regulator 61. In this way, as soon as a blanking pulse is generated by any regulator other than 61, it is sensed by regulator 61 which produces its own blanking pulse, thereafter sustained for the whole duration of the originating pulse through pin 3 and for a further delay interval through pin 4.

DESCRIPTION OF OPERATION

Figure 5:
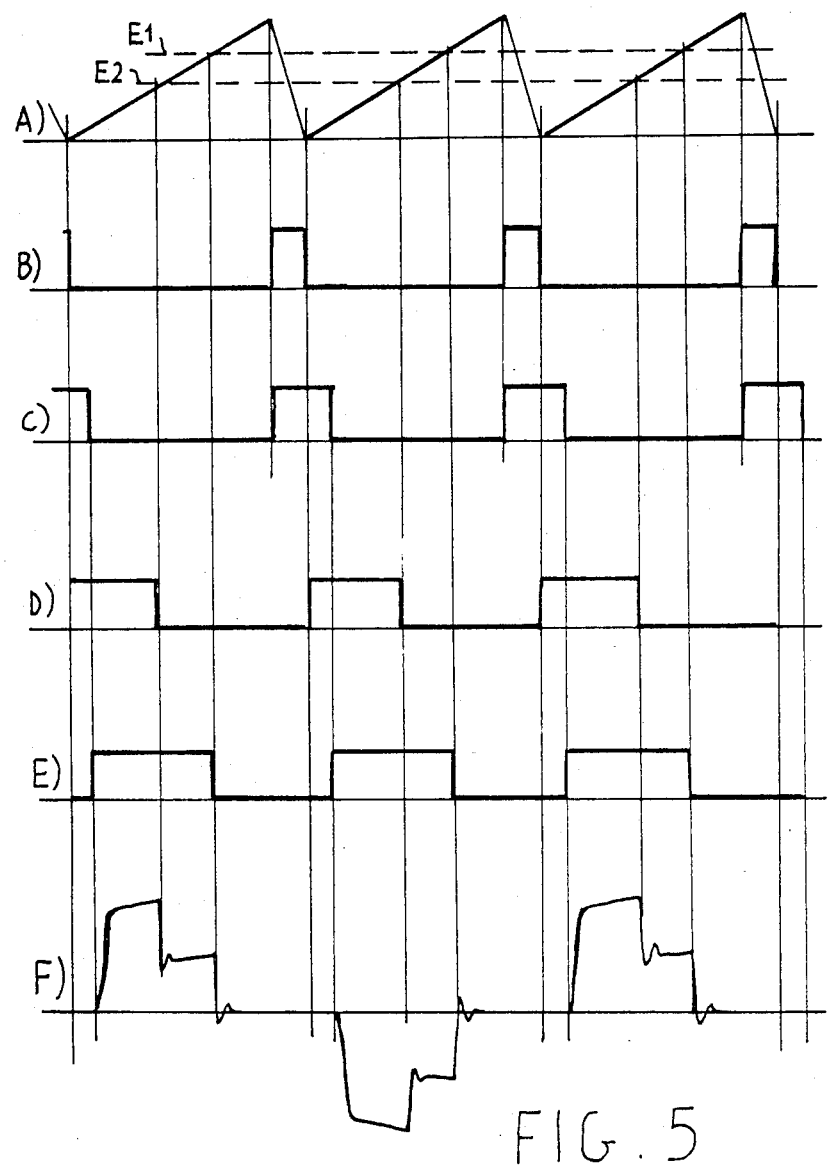

It is now possible to consider with reference to the timing diagrams of FIG. 5, the operation of the power supply of the invention. Diagram A shows the sawtooth voltage signal available at pin 5 of each and all regulators 60, 60N and 61, as well as an exemplary level of error signals E2 and E1. It is clear that such level is variable. Diagram B shows the blanking pulses available at pin 4 of regulators 60 and 60N. Diagram C shows the blanking pulses available at pin 4 of regulator 61. Diagram D shows the voltage pulses applied to winding 75. Such pulses have a variable width, raising with the falling edge of blanking pulses in diagram B and dropping when the sawtooth signal exceeds the error voltage E2.

Diagram E shows the voltage pulses applied to winding 34. Such pulses have a variable width, raising with the falling edge of blanking pulses in diagram C and dropping when the sawtooth signal exceeds the error voltage E1. The voltage pulses, shown in diagrams D and E, control the turn-on and turn-off of transistor 45 and transistors 30 and 31, respectively. It may be noted that transistor 45 is turned on and turned off in advance of transistors 30 and 31. Consequently, when transistors 30 and 31 are turned off, they switch off the equivalent current flowing in winding 28 feeding inductor 39 and main load 42, not the equivalent current flowing in winding 29. The equivalent current flowing in winding 29 has been already switched off by transistor 45.

Accordingly, turn-off losses due to current switch-off are distributed among different switching components. Moreover, since switching-off losses in semiconductor components and with inductive load (the load seen by transistors 30, 31 and 45 is substantially inductive, due to the presence in the load circuit of inductors 39 and 46 and transformer T0) are not proportional to the switched current, but increase more than proportionally with the level of the switched-off current, an overall loss reduction occurs. The transformer ringing is limited in amplitude due to the fact that switched off-current is the only equivalent current of secondary winding 28.

When transistor 45 is switched on, no e.m. force is induced in winding 29, therefore, no substantial voltage is applied between the collector and emitter of transistor 45 which is brought to saturation substantially without switching losses. When transistors 30 and 31 are switched on, a current starts flowing in winding 27 and an e.m. force is induced in windings 28 and 28. Therefore, a current is switched on and is established in winding 27 which is the sum of equivalent current in winding 28 and the equivalent current in winding 29, transistor 45 being already conductive. The voltage and current rise in the secondary winding is not abrupt, but smooth due to the following several factors:

(1) The load seen by transformer is quite high due to both the load of the main output and the load of the auxiliary output(s), thus increasing the damping factor of the transformer and preventing/minimizing the voltage/current overshooting at the secondary outputs.

(2) When the e.m. force induced in secondary windings begins to rise, diode 48, as well as rectifying diodes 37, 38, 43 and 44, are all forward biased, hence conductive, further increasing the transformer load and its damping factor.

The slow voltage rising in windings 28 and 28 allows for the reverse biasing of diode 48, and the relevant diode in the pairs 37 and 38 and 43 and 44 (depending on the direction of the induced e.m. force) substantially without current peaks due to diode reverse biasing currents. Correspondingly, switch-on losses in transistors 30 and 31 are minimized because turn-on occurs at a low current level and is not affected or remarkably affected by overshooting. Further, current overshooting is prevented or substantially limited and does not subject the transistors to uncontrollable stresses due to current spikes. Thus, transistors 30 and 31 may be selected to have a lower current rating than required to withstand unpredictable level current spikes and higher reliability is achieved. Diagram F in FIG. 5 shows the equivalent current flowing in the primary winding of transformer T0.

The above description shows that substantial advantages are achieved thanks to delay element 77 or by adopting an operational concept for a power supply which may be defined as switch-on synchronization among regulating sections, with the delay of the main regulating section controlled at the primary winding, and auxiliary sections being controlled at secondary windings. The same result may be obtained at some extent with a proper selection of operative components. For instance, rather than using switching bipolar transistors for current control on both primary winding and auxiliary winding(s), power MOS field effect transistors may be used for controlling current of the auxiliary windings, together with bipolar transistors controlling the main windings. MOS FETs have a switching time which is typically in the range of 100 to 200 nanoseconds against a turn-off/turn-on time of a power switching bipolar transistor which is in the range of 400 to 600 nanoseconds, not considering the delay caused by the driving circuit. Therefore, switches such as 45 of FIG. 3 when implemented by a MOS FET, may become full conductive well before switches, such as 30 and 31, implemented by bipolar transistors become full conductive even if both switches are driven in perfect synchronization by the same pulse.

However, the embodiment shown in the drawings and described with reference thereto is preferable because it leads to the possible use of power MOS FETs for current switching at both the primary winding and the auxiliary windings, with an overall reduction of power losses, the achievement of higher efficiency of the power supply, the possibility of increasing the switching frequencies, while decreasing encumbrance and cost of inductive and capacitive components. It is clear that the invention described in connection with a specific form of embodiment for the power section of the power supply may be used with a different embodiment of the power section and, in general, in all embodiments where one or more switches control the current flowing in a primary winding, for the purpose of regulating voltage at an output of a secondary winding, and one or more switches control the current drained from a further secondary winding for the purpose of regulating voltage at the output of such further secondary winding. By the same token, the driving of such switches through driving transformers, such as T1 and T2, is only exemplary and a different form of coupling, such as direct coupling, can be used. Further, while the shown control circuitry has been described with reference to integrated circuits available on the market so that regulating pulse width modulator 60 performs both the function of master oscillator, for generation of periodical blanking pulses, and sawtooth signal generator, different embodiments can be envisioned where an independent measter oscillator triggers a plurality of independent sawtooth signal generators and a plurality of pulse width modulators, each responsive to a different and independent sawtooth signal.

What is claimed is:

1. A multiple output switching power supply having a main output and at least an auxiliary output and comprising:

a transformer having a primary winding, a main output secondary winding and at least an auxiliary output secondary winding;
    first switching means for controlling the current flowing in said primary winding;
    rectifying and filtering means connected at the output of said main output secondary winding;
    second switching means for controlling the current flowing in said auxiliary output secondary winding and coupled to said auxiliary output;
    an oscillator for deliverying clock blanking pulses having a preestablished period;
    a first pulse width modulation control circuit coupled to said oscillator, and to said second switching means, said first pulse width modulation control circuit responsive to the voltage detected at said auxiliary output and to said clock blanking pulses to switch on said second switching means at the termination of said blanking pulses and to switch off said second switching means after a time interval which is less than said period as a function of said voltage detected at said auxiliary output;
    delay means connected to receive said clock blanking pulses and provide as an output, delayed blanking pulses; and,
    a second pulse width modulation circuit, responsive to the voltage detected to said main output and to said delayed blanking pulses to switch on said first switching means at the termination of said delayed blanking pulses and to switch off said first switching means after a time interval, less than said period as a function of the voltage detected at said main output.

2. A multiple output switching power supply having a main output and at least an auxiliary output and comprising:

a transformer having a primary winding, a main output secondary winding and at least an auxiliary output secondary winding;
    first switching means controlling the current flowing in said primary winding;
    rectifying and filtering means connected at the output of said main output secondary winding;
    second switching means for controlling the current flowing in said auxiliary output secondary winding and coupled to said auxiliary output;
    an oscillator delivering clock blanking pulses having a preestablished period;
    a first pulse width modulation control circuit responsive to the voltage detected at said auxiliary output and to said clock blanking pulses, to switch on said second switching means with a first turn-on delay from the termination of said blanking pulses, and to switch off said second switching means after a time interval which is less than said period and depends on the voltage detected at said auxiliary output; and,
    a second pulse width modulation control circuit responsive to the voltage detected at said main output and to said clock blanking pulses, to switch on said first switching means with a second turn-on delay greater than said first turn-on delay, from the termination of said blanking pulses, and to switch off said first switching means after a time interval which is less than said period as a function of the voltage detected at said main output.

3. The multiple output power supply of claim 2 wherein said first switching means includes a bipolar transistor for providing said second turn-on delay and said second switching means includes a power MOSFET providing said first turn-on delay which is less than said second turn-on delay.

4. A multiple output switching power supply having a main output and at least an auxiliary output and comprising:
- a transformer having a primary winding, a main output secondary winding and at least an auxiliary output secondary winding;
- first switching means for controlling the current flowing in said primary winding;
- rectifying and filtering means connected at the output of said main output secondary winding;
- second switching means for controlling the current flowing in said auxiliary output secondary winding and coupled to said auxiliary output;
- first pulse width modulation circuit means having a first input coupled to receive a voltage detected at said auxiliary output and first and second outputs, said first output being coupled to said second switching means, said first pulse width modulation circuit means including:
  - oscillator circuit means for generating at said second output, clock blanking pulses having a pre-established period and control circuit means coupled to said second output and responsive to said voltage and to said blanking pulses to switch on said second switching means at the termination of each of said blanking pulses and to switch off said second switching means after a time interval which is less than said period as a function of said voltage;
- means coupled to said second output for receiving said clock blanking pulses and for providing delayed blanking pulses; and
- second pulse width modulation circuit means having a first input coupled to receive a voltage detected at said main output and first and second outputs coupled to said first switching means and to said delay means, said second pulse width modulation circuit means in response to said main output voltage and to each of said delayed blanking pulses to switch on said first switching means at the termination of said each of said delayed blanking pulses and to switch off said first switching means after a time interval which is less than said period as a function of said main output voltage.

5. The power supply of claim 4 wherein said second pulse width modulation circuit means includes control circuit means and wherein said first and second pulse width modulator circuit means each further includes a third output connected to said oscillator circuit means and means connecting in common said third output of said first and second pulse width modulation circuit means for synchronizing the operation of said control circuit means of said first and second pulse width modulation circuit means.

* * * * *